United States Patent
Connery et al.

(10) Patent No.: US 6,570,884 B1
(45) Date of Patent: May 27, 2003

(54) RECEIVE FILTERING FOR COMMUNICATION INTERFACE

(75) Inventors: Glenn William Connery, Sunnyvale, CA (US); Patricia Cross, Westborough, MA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/434,253

(22) Filed: Nov. 5, 1999

(51) Int. Cl.[7] .............................................. H04L 12/28
(52) U.S. Cl. ........................ 370/419; 370/392; 713/154
(58) Field of Search ................................. 370/389, 419, 370/422, 423, 428, 429, 395, 230, 232, 235, 236, 400, 401; 709/250; 713/153, 154

(56) References Cited

U.S. PATENT DOCUMENTS

| | | | | |
|---|---|---|---|---|
| 4,500,990 A | * | 2/1985 | Akashi ........................ | 370/235 |
| 5,473,607 A | * | 12/1995 | Hausman et al. ........... | 370/395 |
| 5,530,703 A | * | 6/1996 | Liu et al. .................... | 370/255 |
| 5,615,340 A | * | 3/1997 | Dai et al. ................... | 709/250 |
| 5,909,686 A | * | 6/1999 | Muller et al. ............... | 707/104 |
| 6,108,713 A | * | 8/2000 | Sambamurthy et al. ..... | 709/250 |

OTHER PUBLICATIONS

"Network Device Class" Microsoft Corporation, published at http://www.microsoft.com/hwdev/specs/PMref/PMnetwork.htm. pp. 1–11.

* cited by examiner

*Primary Examiner*—Ken Vanderpuye
*Assistant Examiner*—Bob A. Phunkulh
(74) *Attorney, Agent, or Firm*—Mark A. Haynes; Haynes Beffel & Wolfeld LLP

(57) ABSTRACT

An interface card for a network or other communication channel, with limited intelligence, is implemented using a relatively slower, and lower cost embedded processor, supported by dedicated hardware logic for the purposes of intercepting certain packets being received via the network or communication channel. The interface comprises the first port on which incoming data is received at the data transfer rate of the network, a buffer coupled to the port that stores received packets, and a second port coupled with the buffer through which transfer of packets to the host is executed. Packet filters are coupled to the first port which identifies packets being stored in the buffer that have one of the plurality of variant formats. A processor is coupled with the buffer as well, and is responsive to the packet filter to process identified packets in the buffer. The pattern match logic includes mask logic circuits, circuits to generate a hash in response to bytes selected by the mask, and a comparator which compares the output of the hash logic with an expected hash. If a match is detected, then the processor is signaled that the packet being received is, or may be, suitable for processing on the network interface card. The mask logic uses the mask modifier in response to the packet format, so that variations of a particular format can be handled with a single set of pattern match logic circuits.

46 Claims, 3 Drawing Sheets

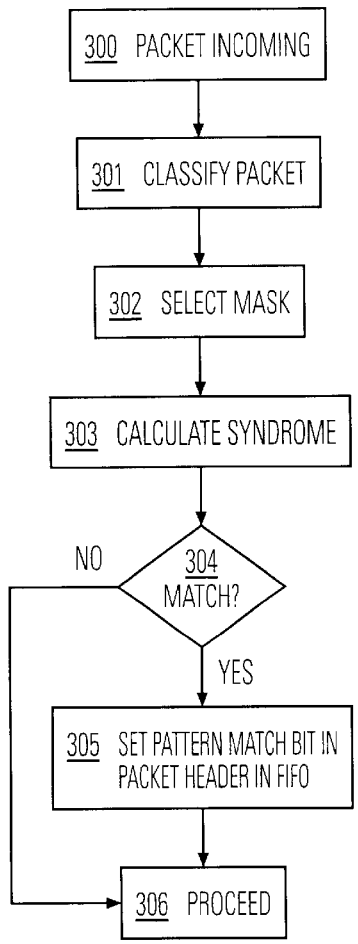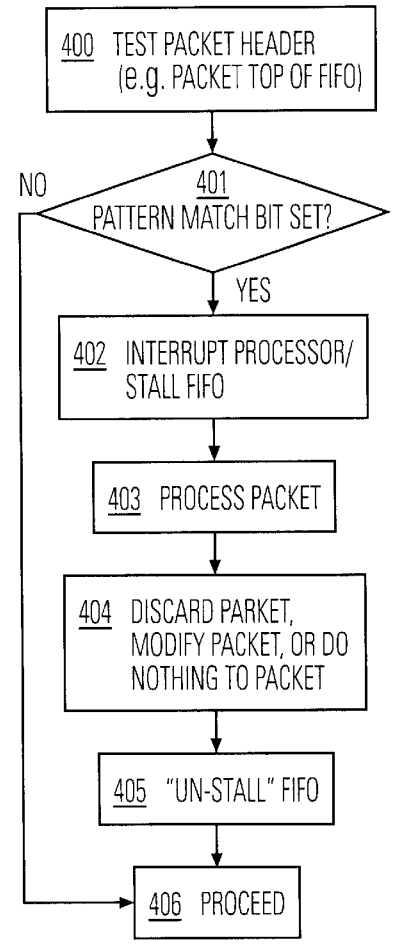
FIG. 4
FIG. 5

RECEIVE FILTERING FOR COMMUNICATION INTERFACE

BACKGROUND OF THE INVENTION

1. Field of the Invention

The present invention relates to network interface devices for interconnecting host processors with a communication network, and more particularly to the processing of specific types of packets at the network interface.

2. Description of Related Art

Management of computer networks is accomplished in many systems by a central network management station which has access to end stations in the network for management functions. Several specialized control packets have been developed, which are transmitted to the end stations in support of these management functions. Some of these control packets are suitable for processing at the network interface, rather than after delivery to the host system on which the network interface is attached.

In one prior art system, network interface devices are configured to capture packets while the host system is not active, including "wake up" packets using resources on the interface card. See, NIC Device-Class Power Management Specification, Version 1.0a, Nov. 21, 1997; Microsoft Corporation. (See, http://www.microsoft.com/hwdev/specs/PMref/PMnetwork.htm). The NIC Device-Class Power Management Specification handles the situation in which a host processor running Windows or another operating system OS wants to go to sleep, yet allow others to access any shared directories or devices it might have offered to the network. So the host OS passes the adapter a set of filters (filter=bit mask to specify which bytes are interesting and a byte string for comparing the interesting bytes) which the adapter should use. If a packet comes in matches the filters, then the adapter wakes up, and signals power management resources in the host system.

As the speed and complexity of networks increase, more types of packets are suitable for being handled by processors in the smart interface cards. In order for a processor to react to the contents of packets, it must have resources to read the relevant part of the packet, and execute the appropriate instructions, as data is passing through the network interface card. If the processor cannot keep up with the network, then packets will be dropped and network throughput will suffer. Relatively powerful processors by today's standards are required to keep up with fast networks, such as 100 Megabit per second or Gigabit per second Ethernet. However, such powerful processors add significant cost to the network interface cards. This imbalance in the cost of processing power and network speed is likely to continue to arise in a variety of settings as technology advances on both fronts.

Accordingly, it is desirable to provide a network interface capable of handling certain specialized packets, without incurring the increased costs associated with powerful on chip, or on-board, processors.

SUMMARY OF THE INVENTION

The present invention provides a network interface card, or an interface to other types of communication channels, with limited intelligence, implemented using a relatively slower, and lower cost embedded processor, supported by dedicated hardware logic for the purposes of intercepting certain packets being received via the network. In particular, the present invention provides an interface that comprises the first port on which incoming data is received at the data transfer rate of the network, a buffer coupled to the port that stores received packets, and a second port coupled with the buffer through which transfer of packets to the host is executed. Packet filters are coupled to the first port which identifies packets being stored in the buffer that have one of the plurality of variant formats. A processor is coupled with the buffer as well, and is responsive to the packet filter to process identified packets in the buffer. In this manner, the processor is able to operate at a slower speed, such that the processing time for a typical packet is greater than the amount of time that is consumed by storing a typical packet in the buffer. Because the processor is only required to handle packets identified by the dedicated packet filter logic, it need not have the capability to keep up with the entire data stream.

In various embodiments, the packets intercepted according to the present invention include a remote control packet allowing a management console to remotely reboot the targetted computer. Such a packet would simply be discarded by the interface processor and an action performed to reboot the computer, such as by sending a command to the host using a management interface like the SMBus (See, Smart Battery System Specifications—System Management Bus Specification, Rev. 1.0, (1995) Benchmarq Microelectronics, Inc., et al.).

In another embodiment the intercept technique of the present invention is used for tracking the host computer's IP address. The processor on the interface card might need to know the local internet protocol IP address of its host This can be complicated if Dynlamnic Host Configuration Protocol DHCP, or another protocol for assigning dynamic IP addresses to devices on a network, is in use by which the IP address might change over time. By trapping the DHCP packets and examining them before passing them to the host, the interface card can track the changes in the IP address as they happen, and do it without adding any extra instructions to the critical code paths on the host which might increase CPU utilization or reduce performance. The invention is particularly suited to environments in which the host system is actively handling communications and other processing tasks, and in which the adapter is able to take over some specialized tasks without interfering with the active processing in the host system.

For example, in one embodiment the first port comprises a medium access control unit configured for network having a data rate of 100 Mbps or higher. In this example, a simple RISC processor operating with a processor clock of 25 MHz, and an effective rate of executing instructions of less than 25 MHz, is provided on the network interface card.

According to various aspects of the invention, the packet filter comprises one or more match logic circuits. The match logic circuits comprise mask logic circuits that store a mask identifying selected bytes within a packet of a particular format in the plurality of variant formats. Logic circuits to generate a hash in response to the selected bytes, such as cyclical redundancy code CRC hash logic, are coupled to the incoming port on the device. A comparator compares the output of the hash logic with an expected hash. If a match is detected, then the processor is signaled that the packet being received is, or may be, suitable for processing on the network interface card. The hash used by be imperfect, so that occasional packets that need not be processed by the local processor are trapped.

According to another aspect of the invention, the mask logic within the pattern match logic includes a mask and a mask modifier. The mask logic uses the mask modifier in response to the packet format, so that variations of a particular format can be handled with a single set of pattern match logic circuits. For example, certain packets may have a format accommodating optional fields. The mask modifier is applied to account for the presence or absence of data in the optional fields, while selecting the bytes for input to the hash logic. For example the mask is modified by logic which causes certain bytes to be skipped by the mask and hash generator.

According to various embodiments of the invention, the buffer comprises a First-In-First-Out (FIFO) buffer, a page mode RAM buffer, or other memory on or off the chip. As packets are supplied to the buffer, logic on the network interface card inserts a control field, such as a header, in the buffer. The results of the pattern match logic are written as a flag, or flags, in the control field to indicate whether the packet has a particular one of the plurality of variant formats. When a particular packet in the FIFO buffer reaches a stage for upload to the host computer, the logic on the network interface card issues an interrupt to the processor on the network interface card if a flag is set. In response to the interrupt, the packet in the FIFO buffer is processed locally on the network interface card. If the FIFO buffer overflows during the processing of the packet, then packets may be lost. However, because of the relatively small number of packets to be processed by the local processor, very few packets will be lost in the typical network.

According to yet another aspect of the invention, a single integrated circuit for an Ethernet network interface card comprises an Ethernet medium access control (MAC) unit on which incoming data is received at a data transfer rate of 100 Mbps or higher. A FIFO buffer is coupled to the MAC unit. A host port is coupled with the FIFO buffer through which transfer of packets to the host is executed. Packet filters are included on the chip as discussed above with mask logic, hash logic and a comparator used for signaling an on chip processor that a packet having a particular format is being stored in the FIFO buffer. At least a particular format in the plurality of variant formats supports packets having an optional field as mentioned before. Mask modifier logic is included to modify the mask to account for the optional field. The optional field comprises in various embodiments a virtual local area network (VLAN) tag or a subnetwork attachment point (SNAP) header.

Accordingly, an integrated circuit network interface device for a high speed network medium is provided with the relatively slow, low-cost embedded processor. Hardware pattern matching logic supports pattern matching at the speed of the incoming packet stream, and signals the embedded processor when a packet having one of the plurality of variant formats is detected. Further, the embedded pattern matching logic uses minimum space on the chip, by for example, including logic to handle optional fields in particular packet formats in a single pattern matching engine.

Other aspects and advantages of the present invention can be seen upon review of the figures, the detailed description and the claims which follow.

BRIEF DESCRIPTION OF THE FIGURES

FIG. 4 is a flow chart illustrating the processing of an incoming packet by the pattern matching logic.

FIG. 5 is a flow chart illustrating the processing of a packet by the embedded processor in response to a pattern match.

DETAILED DESCRIPTION

Figure 1:
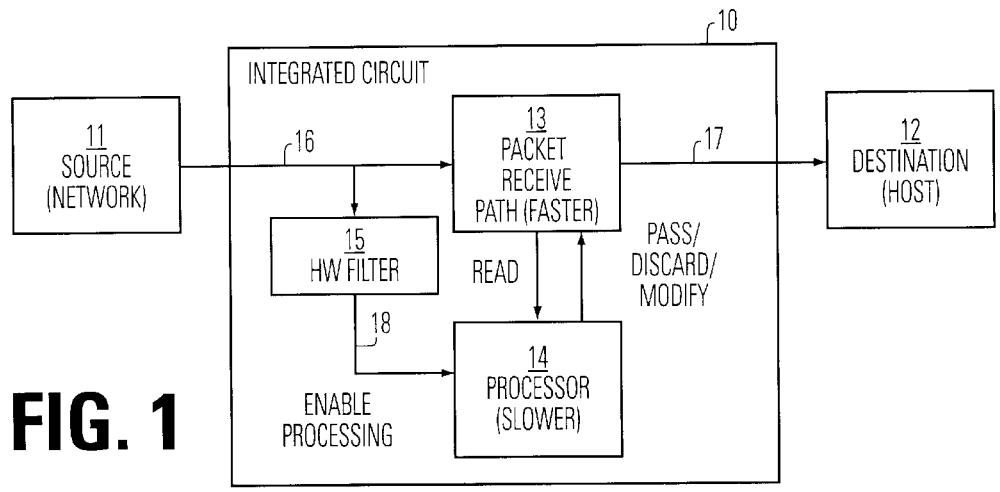
FIG. 1 is a block diagram showing an architectural overview of a network interface device having receive filtering according to the present invention.

A detailed description of embodiments of the present invention is provided with respect to FIGS. 1–5. FIG. 1 shows a simplified overview of an integrated circuit 10 between a source network 11 and a destination host 12, according to the present invention. The integrated circuit 10 includes a packet receive path 13 and an embedded processor 14. Hardware filtering logic 15 is also included on the integrated circuit 10. A packet stream is received via line 16 at the receive path 13, and at the hardware filter 15. The processor 14 is coupled to the receive path 13 for the purposes of reading selected data packets, and of performing processing on the data packets to decide whether to pass the packet to the destination 12 via line 17, to discard the packet, or to modify the packet and then pass it for processing at the host 12. The hardware filter 15 identifies a packet having one of a plurality of variant formats, and signals in the processor 14 via line 18 to enable processing of the identified packets. In this manner, the receive path 13 may operate at speeds much faster than the processor 14 is capable of processing packets in the receive path 13. The integrated circuit 10 is capable therefore of handling higher speed networks with more complex network management functions, with reduced disruption of the processes in the receive path 13, with a lower cost processor. The processor 14 assisted by the hardware filter 15 may be slower, and have lower cost, than a more complex and higher speed processor which would be required without the filter 15.

Figure 2:
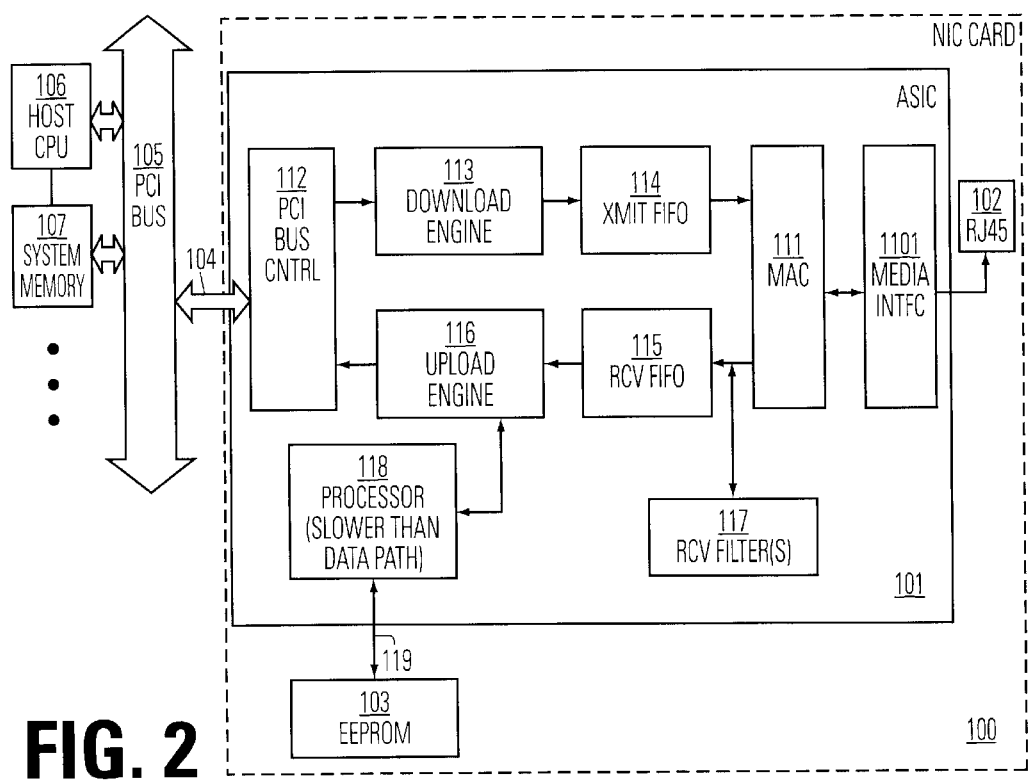
FIG. 2 is a more detailed diagram of a network interface card including an integrated circuit with embedded pattern matching logic according to present invention.

FIG. 2 illustrates in more detail, a network interface implemented according to the present invention. Network interface is implemented on a print circuit board 100 and includes an application specific integrated circuit 101 for managing the interface. A connector 102, such as an RJ45 is coupled to the circuit 101. Also, on-board memory 103 implemented for example with an EEPROM is coupled to the circuit 101. The ASIC 101 also supports an interface 104 to a system bus 105, implemented in this example with a standard PCI bus. A host CPU 106 and system memory 107 are coupled to the bus 105, and to one another. The host CPU 106 and system memory 107 are representative of a wide variety of computer system architectures for personal computers, workstations, servers, and other data processing systems.

The integrated circuit 101 includes a media interface 110 which provides physical layer interface functions for the network. A medium access control unit 111 is coupled to the media interface circuitry 110. Together the medium access control unit 111 and the media interface circuit 110 act as a port to a network medium through the connector 102. The interface 104 is coupled to bus control logic 112, in this example PCI bus control logic. The PCI bus control logic 112 and interface 104 act as a port to the host system.

A transmit path comprises the port 112, a download engine 113, a transmit FIFO 114, and the medium access control unit 111. A receive path comprises the medium access control unit 111, a receive FIFO 115, and a load engine 116 coupled to the PCI bus control logic 112.

A set of receive filters 117 is coupled to the receive path, in this example at the input to the receive FIFO 115. The receive filters 117 may be coupled to the receive path in a variety of configurations as suits a particular implementation. The set of receive filters 117 include hardware pattern matching logic for identifying incoming packets that have one of a plurality of variant formats. Implementations of the hardware pattern matching logic of the receive filters 117 are described in more detail below.

An embedded processor 118 is also coupled to the receive path, and to other components on the ASIC 101. The embedded processor 118 is coupled to the on-board memory 103 via interface 119. The processor executes instructions stored in the memory 103, in order to process identified packets in the receive path.

In one embodiment, the processor 118 comprises a RISC processor operating with a processor clock of 25 MHz, such as for example an ARM7 embedded processor subsystem commercially available from ARM Ltd., of Cambridge, England. The effective instruction execution rate of the processor in this example is less than 25 MHz, because of the limitations imposed by the speed of the on-board memory 103.

The medium access control unit 111 and the media interface circuitry 110 in this example are adapted for a 100 Mb Ethernet network. The processor 118 in this example may not be capable of reading every packet to determine whether to pass, modify or discard the packet, and to perform such additional processing as might be required in response to such packet at the data rate of the receive path.

Other processor modules, such as 16-bit or 32-bit RISC processors having clock speeds in the range of 20 Mhz to 50 MHz, could be used in various preferred embodiments designed for a low cost 100 Mb Ethernet interface chips. For higher speed interfaces, higher speed processors could be used, while benefitting from the present invention. For example, a 125 MHz ARM processor might be used for support of a Gigabit Ethernet interface chip.

Figure 3:
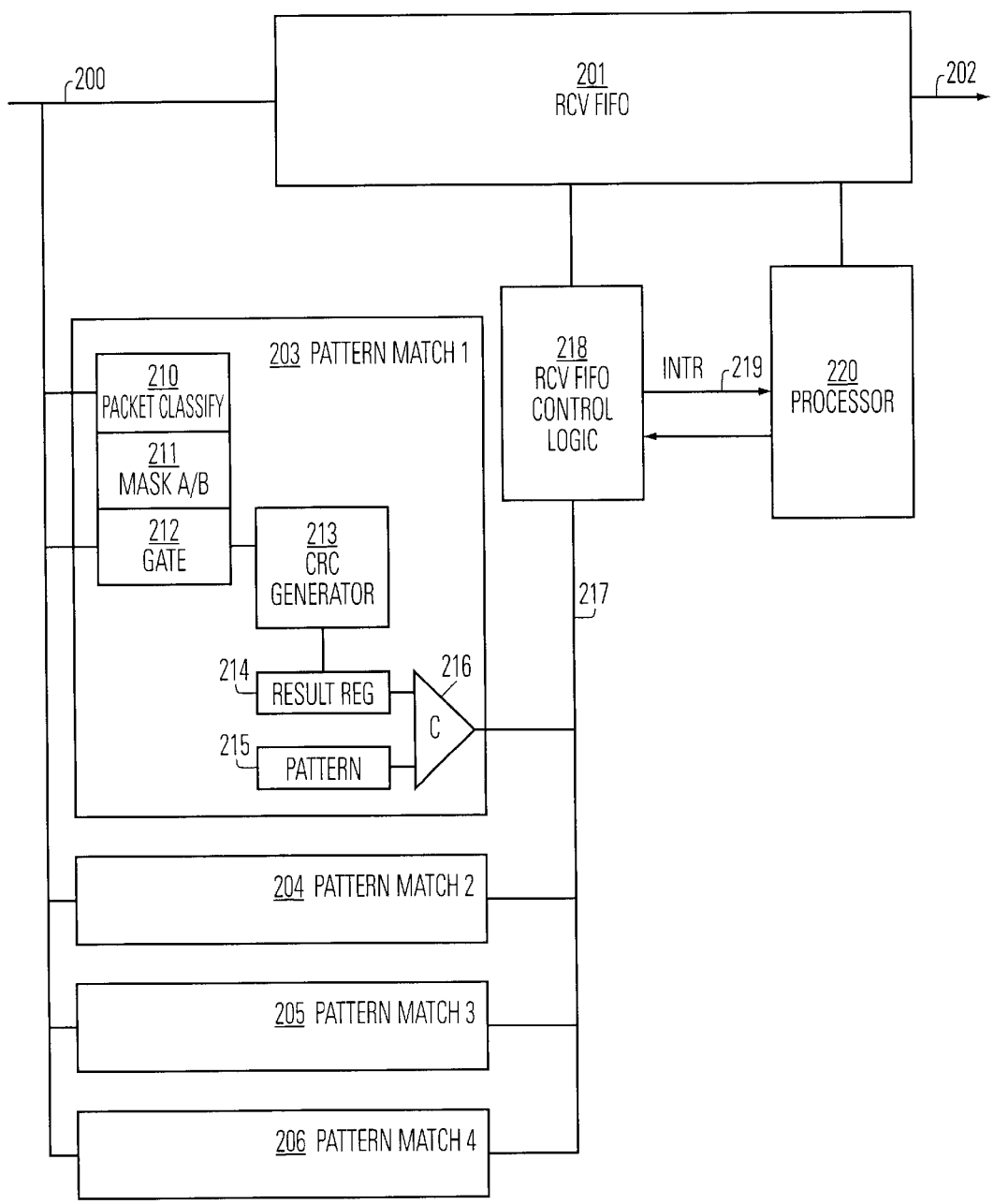
FIG. 3 is a logic diagram of one embodiment of the pattern matching logic according to the present invention.

FIG. 3 illustrates the pattern matching logic according to one embodiment of the invention. Incoming data is received on line 200. The incoming data is supplied to the receive FIFO 201, and from receive FIFO 201 on line 202 to the host port. Line 200 is coupled to a plurality of pattern match modules, modules 203, 204, 205 and 206 in this example. Module 203 includes a packet classify unit 210, a mask register 211 which has a first mask, MASK A, and conceptually a modified mask, MASK B, and gate logic 212 which is responsive to the selected mask. An incoming packet according to this embodiment is classified according to the presence or absence of an optional field in the packet. Depending on the presence or absence of the optional field, MASK A or MASK B is selected. Gating logic 212, including a mask, selects particular bytes for supply to a CRC generator 213. In one example, the gating logic selects 16 bytes from the leading set of 128 bytes in the packet. In one embodiment, the gating logic comprises a mask having 128 bits corresponding to 128 bytes of an incoming packet. The mask passes bytes to the hash logic, for which a corresponding bit is set.

The CRC generator is one example hash logic. Other examples include byte wide summing networks, syndrome generators and logical function generators. The result of the hash logic may be truncated or not for various embodiments prior to comparison with the stored value.

Instead of multiple mask registers, another embodiment of the mask modifier logic uses additional control logic which causes certain bytes to be skipped over or ignored by the mask/checksum operation. For example, on detection of a VLAN ID starting at the 13th byte, the logic skips over four bytes as if they weren't there, causing the mask/checksum logic to see only bytes 1 . . . 12, 17–N. Similarly control logic looks for variants of the standard IP header (0800h in the Ethernet Length field) and makes them look like the standard IP header to the mask/checksum logic, by skipping over most of the SNAP header. In this manner, the interface chip may have only one 128-bit filter store and one checksum register, saving tremendously in gate count on the device, over the multiple mask register approach described above.

The CRC generator 213 produces a hash from the selected bytes which is supplied to a result register 214. Other types of hash logic, or other types of hash generating logic, are also suitable alternatives to the CRC generator 213. The CRC generator 213 is a convenient module for generation of the hash for network interface cards, because of the use of similar CRC generators in other aspects of the device.

An expected hash value is stored in a hash register 215. The contents of the result register 214 and the value in the hash register 215 are compared at comparator 216. The result is supplied on line 217 to receive FIFO control logic 218.

The pattern match modules 204, 205 and 206 are implemented with a similar architecture to that of pattern match module 203. Alternative embodiments eliminate the package classify logic 210, and store a single mask in place of the mask register 211 having a mask modifier.

The receive FIFO control logic 218 writes a flag in a packet header which is maintained at the lead of each packet as it passes through the receive FIFO 201. The flag indicates results from each of the four pattern match engines for the packet. When a packet reaches the top of the receive FIFO 201, the receive FIFO control logic 218 generates an interrupt on line 219 to the processor 220. The processor accesses the packet from the receive FIFO 201 for processing.

In an alternative embodiment, the packet is supplied in parallel to a RAM buffer which is independent of the receive FIFO 201. The preferred embodiment utilizes the FIFO in combination with the header carrying the pattern match flags, in order to save chip area.

FIG. 4 illustrates a basic process executed upon receiving an incoming packet. Thus, the process begins with receiving an incoming packet (block 300). The hardware pattern matching engine classifies the packet by determining whether the packet includes an optional field or not (block 301). A mask is selected based on a packet classification (block 302). The bytes of the incoming packet are used by the pattern matching logic to calculate a hash (block 303). The comparator in the pattern matching engine determines whether a match is found with an expected hash (block 304). If a match is found, then a pattern match bit is set in the packet header of the receive FIFO (block 305). After setting the flag, the process proceeds (block 306). If a match is not detected in block 304, then the process proceeds without setting the packet header bit.

FIG. 5 illustrates the processing which occurs upon interrupting the processor, and the handling of the packet by the processor. The process begins when a packet is at the top of the receive FIFO by testing the packet header (block 400). The logic determines whether a pattern match bit is set (block 41). If the pattern match bit is set, then the processor is interrupted and the receive FIFO is stalled (block 402). Other incoming packets may still be stored in the FIFO, until it overflows. In a typical case, the processor is able to handle the packet, before a FIFO overflow condition occurs. Upon receiving the interrupt, the processor handles the packet (block 403). As result of the packet handling process, the processor decides whether to discard the packet, modify the packet, or do nothing allowing the packet to proceed unchanged to the host (block 404). Upon completion of processing, the FIFO is "un-stalled" to begin continued handling of the data flow (block 405). After restarting the FIFO, the process proceeds (block 406) with handling packets in the data stream. If the pattern match bit was not set a block 401, then the process branches to block 406 directly.

Alternative implementations are possible here. For example, the system could issue an interrupt to the processor as soon as the match is detected, rather than waiting for the packet to get to the top of the FIFO. An immediate interrupt could result in more than one packet interrupting the processor and require some kind of stack or other control construct to specify where the corresponding packets were. Interrupts could be issued to the processor before the packet was completely received. In this case, because the CRC used for error checking is found at the end of the Ethernet packet, the interrupt would occur whether the packet is any good or not. So an interrupt could occur on a bad packet that should simply be discarded. For example, the packet might be a runt due to an underrun, and it would be better to wait for the retransmission rather than looking at this packet. Also, it may not be necessary to stall the upload engine. You could have an implementation where the embedded CPU simply has to get to the packet before it gets uploaded/discarded, or else it would miss the packet. Also, the host might upload the packet but not be able to discard it until the adapter had looked at it, so the packet could still cause an overflow at the interface chip if the embedded processor did not act quickly enough.

In one preferred embodiment, four pattern matching engines running in parallel with the MAC receive state machine are supported. These engines are designed to examine the incoming packets for pattern matches using registers configured by the ARM7 processor during initialization. Since the data information of interest will be detectable via fields within the low-level headers of the packet, the number of bytes into the packet these engines can examine is limited to no more than 128 bytes. These 128 bytes contain MAC addresses, Ethernet type, VLAN tags, IP header, and TCP headers. Each pattern matching engine operates off a 128-bit mask, specifying which bytes in each packet should be examined for a match. It will also have a 4-byte CRC value, computed from the interesting bytes of a potential match. If the CRC of the masked bytes in the incoming packet matches the expected CRC value stored for this engine, a received packet match has occurred.

This match algorithm is imperfect because packets which do not actually match the desired bytes may still match the expected CRC value. The assumption made here is that a few false triggers are acceptable and the probability of false CRC match is very low according to the comprehensive CRC generating algorithm. For each match, the processor does the final qualification to determine whether this is a packet having a target format. This process should reduce the incoming data rate to the processor from the wire by many orders of magnitude, compared with embodiments having no such hardware pattern matching assistance.

Since only a limited number of these engines can be designed into hardware of an ASIC, functional enhancements have been made to allow some additional flexibility. These enhancements deal with the fact that the matching engines can only match from the first byte of the packet in a fixed way. One problem is that Ethernet packets can now optionally contain VLAN tags, including a VLAN ID or packet priority information. It will not be possible to know ahead of time whether a packet involved in pattern matching will have such a tag or not, and matching both a packet with and a packet without such a tag would take twice as many engines. The simplification of the present invention is that an engine can be configured to optionally ignore VLAN tags, acting as if they were not present in the packet. A 4-byte VLAN tag is inserted at offset 12 in the packet, and has a fixed 16-bit unique EtherType to represent it. Implementation of the hardware to modify the mask based on the presence or absence of this tag and to ignore the presence of such a tag for pattern matching purposes is straight forward. This allows the hardware to match both tagged and untagged packets with a single engine.

Also, there are several ways to encapsulate the IP protocol on top of Ethernet. The two byte length/type field of Ethernet frame takes on two meanings, depending on the numeric value of the field. For numerical evaluation, the first byte is the most significant byte of the field. If the value of this field is less than or equal to the value of the maximum size packet 0x5FFh, then the length/type field indicates the number of MAC data bytes contained in the subsequent data field of the frame. This packet type is classified as IEEE 802.3. If the value of this field is greater than or equal to 0x0600h, then the length/type field indicates the nature of the MAC protocol. In this case, the packet type is classified as Ethernet. The length and type interpretations of this field are mutually exclusive.

IEEE 802.3 alone does not have a mechanism to provide multiprotocol operation. Multiprotocol operation is handled by IEEE 802.2 LLC. The LLC header contains an 8-bit destination service access point (DSAP) address, an 8-bit source service access point (SSAP) address and 8-bit control field. When the DSAP and SSAP are each equal to 0xAAh and the control field is equal to 0x03h, a subnetwork attachment point (SNAP) header follows the LLC header. When the three bytes of the organizational code of the SNAP header, following the control field, are equal to 0x00h, the following two bytes are used for the type code field. For example, if the EtherType code is equal to 0x0800h, an IP packet follows.

Based on the packet classification, there are two typical ways to identify the offset of IP header. One way is to use a special EtherType of 0x0800h at offset 12 in the packet. The IP header then follows those bytes. Another way is to use the SNAP header as described in the IEEE 802.3 packet definition, where the EtherType field is actually a packet length (0x0-0x5FFh) and is followed by a special header, AA AA 03 00 00 00 then the standard EtherType 0x0800h. Again, it is desirable for the pattern matching engines to have an optional capability to treat an incoming SNAP encapsulated IP packet as if it were an EtherType encapsulation. For this type of packet, the SNAP header is ignored in the pattern matching process.

These two enhancements allow hardware to handle certain packet-type pattern matching with one engine where otherwise it would require four engines, which should make the limited number of engines more useful and save logic gates.

The hardware architecture in one preferred embodiment defines a receive FIFO of 2 K bytes, which can hold the maximum size packet temporarily. During the pattern matching process, the engines tag the packet as having matched by setting a bit in its frame start header. Once the packet advances to the front of the FIFO, an interrupt is generated to the ARM7 processor specifying that a packet pattern match has occurred and which engine has the match. The ARM7 processor reads a read pointer register, which controls the receive FIFO upload operation, for the starting address of the matched packet in the receive FIFO. During the processing of the matched packet, the ARM7 processor has a limited amount of time to decide what to do with the matched packet, such as copy certain fields, discard it, or leave it for the host to examine. After examining the matched packet, the ARM7 processor can instruct the upload state machine to either transfer the packet to the host or to discard it. All packets behind the matched packet will not be uploaded to the host until the ARM7 processor has completely processed the matched packet. If the processor takes too long to process the matched packet, and other incoming packets continue to be received off the network, the overflow condition may occur in the receive FIFO and result in dropping incoming packets. The expectation is that this problem can be avoided under most reasonable network traffic conditions since most of the packets the ARM7 processor needs to examine are short, and a block 2 K bytes of receive FIFO provides about 160 us at 100 Mbps for the processor to make the final decision. Once the processor has decided what to do with the packet, it can discard or configure the upload state machine to send the matched packet to the host.

For the pattern matching CRC calculation of the incoming packets, the data rate of the incoming network data stream, such as a 100 Mbit Ethernet network, provides the worst case functional timing requirements. The pattern matching engines are preferably designed to operate with the worst case timing constraint. Therefore, the following analysis is based on the 100 Mbit network traffic. The design also works for any network traffic less than 100 Mbit. For each word received from the 100 Mbit incoming packet, processing takes 320 ns. At 25 Mhz, which is the operating clock speed for the pattern matching engines, 320 ns is equivalent to 8 clock cycles. To be both silicon gate count and implementation efficient in ASIC design, a 8-bit CRC generator is used to accumulate the actual 32-bit CRC results. One 40 ns clock cycle is needed to calculate and store one byte of data for the actual CRC result. So for one word of data, four clock cycles are required to complete the CRC calculation and store the intermediate results for one matching engine. During the 320 ns time slot, before a next valid data word occurs, one 8-bit CRC generator is sufficient to support one pattern matching engine. To implement the four engines specified for this project, four parallel 8-bit CRC generators are required to implement the completed functionality. In general, for every pattern matching engine, one 8-bit CRC generator is required to support the evaluation.

The MAC receive state machine asserts the data valid signal for every word of a incoming packet. The VLAN and packet type identifications are supported by the receive state machine. If VLAN tags or IEEE 802.3 SNAP headers are present in the packet, the receive state machine holds the data valid signal inactive during the transfer of those data words into the receive FIFO. To implement the identification of Ethernet and IEEE 802.3 packets, a two pipeline design in the receive state machine is used to buffer up enough incoming data in order to identify the correct packet types. The pattern matching engines can be individually disabled by setting the appropriate control bits in a receive command register.

The pattern matching mask registers are implemented with SRAM block for smaller die size than the regular flip-flops. For the purpose of register accesses, the ARM7 processor simply reads and writes to a particular address location to retrieve and store data. To simplify the logic design, logic verification, and gate counts, this small block of SRAM does not contain a self-testing BIST controller. It is the responsibility of the hardware diagnostics to perform a soft BIST test for 100 percent fault coverage. The required coverage is achieved by constructing ARM7 code to access all memory bits according to the algorithms specified by each ASIC vendors.

The ARM7 processor can set the appropriate bits in the receive command register to enable the pattern matching engines to filter out the VLAN tags and/or filter out the SNAP headers to limit the number of patterns stored in the ASIC.

To begin processing data for a pattern matched packet, the ARM7 gets an interrupt indicating a pattern matched packet is at the top of the receive FIFO. The ARM7 then reads the status register for the packet to determine the status of the packet. If the packet has been completely received, a dynamic bit in the register will be low.

To read the packet data, the ARM7 must determine where the start and end of the data is. The address of the first word of packet data for the packet at the top of the receive FIFO is contained in a pointer register associated with the FIFO. The end of the current packet is determined by reading another pointer register, which points to the first byte after the last valid byte in the packet at the top of the receive FIFO. The data in the FIFO can then be read.

When the ARM7 is done processing the data, it can flush the packet from the FIFO by issuing either an discard command or an continue command via the Command register. The former command discards the packet while the latter command lets the packet continue to the host.

When pattern matching is enabled, the ARM7 may wish to examine the contents of the packet which was matched. To do this it must read the data out of the receive FIFO.

When a pattern has been matched in a packet, the ARM7 gets a pattern match interrupt. This interrupt, however, will not be generated until that particular packet is at the top of the receive FIFO. At that point the packet has been completely received.

Accordingly, present invention provides an improved network interface suitable for efficient implementation on a single integrated circuit, and having local processing resources for handling the processing of incoming packets. Such processing can be used for a variety of purposes in support of remote network control. For example, the processor may pull out data such as IP addresses or other data used at the interface, or the processor may initiate an action such as re-boot or power up of the host processor, or resetting the interface card. The invention is also applicable to other environments, including environments that do not involve network interfaces, but rather involve any type of interface in which a communication channel is supplying data packets at a high-speed relative to the processing power used for handling selected packets in the channel.

Also, the pattern matching techniques of the present mention have been applied for each interrupt to an on chip general-purpose processor. These pattern matching techniques are also suitable for signaling specialized logic, such as logic used to wake up a personal computer, on or in communication with the network interface card, from a low-power mode.

While the present invention is disclosed by reference to the preferred embodiments and examples detailed above, it is to be understood that these examples are intended in an illustrative rather than in a limiting sense, as it is contemplated that modifications and combinations will readily occur to those skilled in the art, which modifications and combinations will be within the spirit of the invention and the scope of the appended claims.

What is claimed is:

1. An interface in which packets are received having a plurality of variant formats, and transferred to a host system, comprising:

a first port on which incoming data is received at a data transfer rate;

a buffer, coupled to the first port, storing received packets;

a second port, coupled with the buffer, through which transfer of packets to the host is executed;

a packet filter, coupled to the first port, which identifies packets being stored in the buffer having one of the plurality of variant formats;

first logic coupled with the buffer and the second port, to transfer packets from the buffer to the second port; and second logic coupled with the buffer, and responsive to the packet filter to read and process data in the identified packets from the buffer, and to produce a data value dependent on contents of the packet prior to transfer of the identified packets to the second port by the first logic.

2. The interface of claim 1, wherein the second logic comprises a general purpose processor module.

3. The interface of claim 2, wherein the buffer includes memory for a plurality of packets having a typical size.

4. The interface of claim 1, wherein the buffer comprises a First-In-First-Out buffer.

5. The interface of claim 1, wherein the first port comprises a medium access control unit configured for a network having a data rate of 100 Mbits/second or higher.

6. The interface of claim 2, wherein the processor executes instructions at a rate of 50 million per second or less.

7. The interface of claim 2, wherein the first port, buffer, second port, packet filter, first logic and processor comprise components of a single integrated circuit.

8. The interface of claim 1, wherein the packet filter comprises:

mask logic circuits;

hash logic to generate a hash in response to the packet and the mask logic circuits; and compare logic to compare the hash generated with an expected hash for one of the plurality of variant formats.

9. The interface of claim 1, wherein the packet filter comprises:

mask logic circuits, having a mask and a mask modifier logic to modify the mask using the mask modifier in response to the packet;

hash logic to generate a hash in response to the packet and the mask; and compare logic to compare the hash generated with an expected hash for one of the plurality of variant formats.

10. The interface of claim 1, wherein the packet filter comprises a plurality of match logic circuits, each match logic circuit in the plurality comprising:

mask logic circuits storing a mask identifying selected bytes within a packet of a particular format in the plurality of variant formats;

hash logic to generate a hash in response to the selected bytes; and compare logic to compare the hash generated with an expected hash for the particular format.

11. The interface of claim 1, wherein the second logic to process the packet comprises a routine to discover an internet protocol IP address of the host system.

12. The interface of claim 1, wherein the second logic to process the packet comprises a routine to issue a reboot command to the host system.

13. The interface of claim 1, including third logic which signals the second logic to process the data after at least part of the identified packet is stored in the buffer.

14. The interface of claim 1, including third logic which signals the second logic to process the data after the identified packet is stored in the buffer.

15. The interface of claim 1, including third logic which, after at least part of the identified packet is stored in the buffer, stops the transferring of packets to the host by the first logic, signals the second logic to process the data, and re-starts the transferring of packets to the host by the first logic in response to a signal from the second logic.

16. An interface in which packets are received having a plurality of variant formats, and transferred to a host system, comprising:

a first port on which incoming data is received at a data transfer rate;

a buffer, coupled to the first port, storing received packets;

a second port, coupled with the buffer, through which transfer of packets to the host is executed;

a packet filter, coupled to the first port, which identifies packets being stored in the buffer having one of the plurality of variant formats; and first logic coupled with the buffer, and responsive to the packet filter to process data in the identified packets; and second logic to manage the buffer which associates a control field with packets being stored in the buffer, and wherein the packet filter sets a variable in the control field to indicate whether the packet has one of the plurality of variant formats.

17. The interface of claim 16, including third logic which signals the first logic to process data when the variable indicates that the packet has one of the plurality of variant formats.

18. The interface of claim 16, including third logic which signals the first logic to process the data after at least part of the packet is stored in the buffer, when the variable indicates that the packet has one of the plurality of variant formats.

19. The interface of claim 16, including third logic which signals the first logic to process the data after the packet is stored in the buffer, when the variable indicates that the packet has one of the plurality of variant formats.

20. The interface of claim 16, including third logic which, after at least part of the identified packet is stored in the buffer, and when the variable indicates that the packet has one of the plurality of variant formats, stops the transferring of packets to the host, and signals the first logic to process the data, and re-starts the transferring of packets to the host in response to a signal resulting from processing the data in the first logic.

21. An interface to a network in which packets are received having a plurality of variant formats, and transferred to a host system, comprising:

a medium access control (MAC) unit on which incoming data is received at a data transfer rate;

a buffer, coupled to the MAC unit, storing received packets;

a port, coupled with the buffer, through which transfer of packets to the host is executed;

a packet filter, coupled to the MAC unit, which identifies packets being stored in the buffer having one of the plurality of variant formats; and a processor coupled with the buffer, and responsive to the packet filter that executes instructions to read data in the identified packets from the buffer and process the read data to produce a data value, prior to transfer of the identified packets from the buffer to the host.

22. The interface of claim 21, wherein the processing of identified packets by the processor takes a typical amount of processing time for a typical packet, and the buffer stores a typical packet in an amount of time less than the typical amount of processing time.

23. The interface of claim 21, wherein the buffer includes memory for a plurality of packets having a typical size.

24. The interface of claim 21, wherein the buffer comprises a First-In-First-Out buffer.

25. The interface of claim 21, wherein the MAC unit is configured for a network having a data rate of 100 Mbits/second or higher.

26. The interface of claim 21, wherein the processor executes instructions at a rate of 50 million per second or less.

27. The interface of claim 21, wherein the MAC unit, buffer, port, packet filter and processor comprise components of a single integrated circuit.

28. The interface of claim 21, including logic to manage the buffer which associates a control field with packets being stored in the buffer, and wherein the packet filter sets a variable in the control field to indicate whether the packet has one of the plurality of valiant formats.

29. The interface of claim 21, wherein the processor comprises a routine to discover an internet protocol IP address of the host system.

30. The interface of claim 21, wherein the processor comprises a routine to issue a reboot command to the host system.

31. The interface of claim 21, wherein the packet filter comprises:

mask logic circuits;

hash logic to generate a hash in response to the packet and the mask logic; and compare logic to compare the hash generated with an expected hash for one of the plurality of variant formats.

32. The interface of claim 21, wherein the packet filter comprises:

mask logic circuits, having a mask and a mask modifier logic to modify the mask using the mask modifier in response to the packet;

hash logic to generate a hash in response to the packet and the mask; and compare logic to compare the hash generated with an expected hash for one of the plurality of variant formats.

33. The interface of claim 21, wherein the packet filter comprises a plurality of match logic circuits, each match logic circuit in the plurality comprising:

mask logic circuits storing a mask identifying selected bytes within a packet of a particular format in the plurality of variant formats;

hash logic to generate a hash in response to the selected bytes; and compare logic to compare the hash generated with an expected hash for the particular format.

34. The interface of claim 21, wherein at least a particular format in the plurality of variant formats supports packets having an optional field, the packet filter comprises:

mask logic circuits, having a mask for the particular format, and a mask modifier logic to modify the mask depending on detection, or not, of the optional field in the packet;

hash logic to generate a hash in response to the packet and the mask; and compare logic to compare the hash generated with an expected hash for the particular format.

35. The interface of claim 34, wherein the optional field comprises a virtual local area network (VLAN) tag.

36. The interface of claim 34, wherein the optional field comprises a subnetwork attachment point (SNAP) header.

37. The interface of claim 21, including logic which signals the processor to process the data after at least part of the identified packet is stored in the buffer.

38. The interface of claim 21, including logic which signals the processor to process the data after the identified packet is stored in the buffer.

39. The interface of claim 21, including logic which, after at least part of the identified packet is stored in the buffer, stops the transferring of packets to the host, signals the processor to process the data, and re-starts the transferring of packets to the host in response to a result of said processing.

40. An integrated circuit for an interface to a network in which packets are received having a plurality of variant formats, and transferred to an active host system, the integrated circuit comprising:

an ethernet medium access control (MAC) unit on which incoming data is received at a data transfer rate of 100 Mbits per second or higher;

a First-In-First-Out (FIFO) buffer, coupled to the MAC unit, storing received packets;

a port, coupled with the FIFO buffer, through which transfer of packets to the host is executed;

a packet filter, coupled to the MAC unit, comprising a plurality of pattern match circuits, each pattern match circuit in the plurality including mask logic circuits storing a mask identifying selected bytes within a packet of a particular format in the plurality of variant formats;

hash logic to generate a hash in response to the selected bytes;

compare logic to compare the hash generated with an expected hash for the particular format; and logic to identify packets in response to the packet filter and generate an interrupt signal before the identified packets are transferred from the buffer to the host; and a processor coupled with the buffer, and responsive to the interrupt signal from the packet filter that executes instructions to read and process data in the identified packets.

41. The integrated circuit of claim 40, wherein at least a particular format in the plurality of variant formats supports packets having an optional field, and at least one of the plurality of pattern match circuits includes mask modifier logic to modify the mask depending on detection, or not, of the optional field in the packet.

42. The integrated circuit of claim 41, wherein the optional field comprises a virtual local area network (VLAN) tag.

43. The integrated circuit of claim 41, wherein the optional field comprises a subnetwork attachment point (SNAP) header.

44. The integrated circuit of claim 40, wherein the processor comprises a routine to discover an internet protocol IP address of the host system.

45. The integrated circuit of claim 40, wherein the processor comprises a routine to issue a reboot command to the host system.

46. The integrated circuit of claim 40, wherein said logic to identify packets associates a control field with packets being stored in the buffer, and wherein the packet filter sets a variable in the control field to indicate whether the packet has one of the plurality of variant formats.

* * * * *